Oct. 13, 1936.    D. S. COLE    2,057,556

TIRE INDICATING MEANS AND METHOD

Filed April 8, 1932    3 Sheets-Sheet 1

INVENTOR.
Dale S. Cole
BY Slonghand Caufield
ATTORNEY.

Oct. 13, 1936.                D. S. COLE                2,057,556
                    TIRE INDICATING MEANS AND METHOD
                 Filed April 8, 1932         3 Sheets-Sheet 2
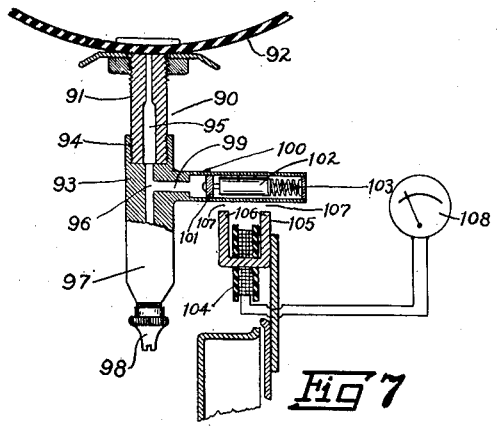
Fig 7
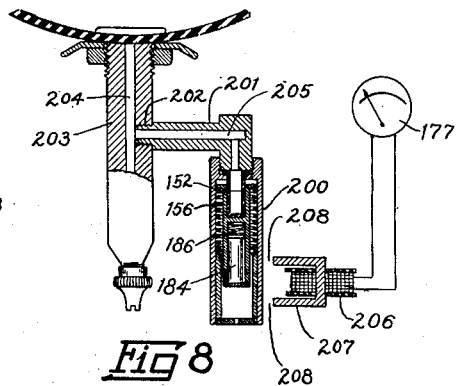
Fig 8
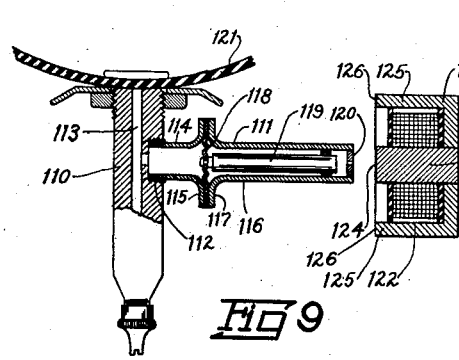
Fig 9
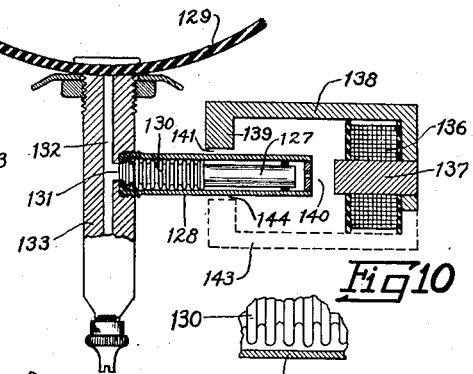
Fig 10
Fig 11
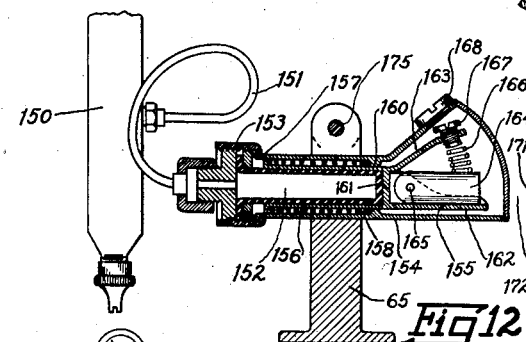
Fig 12
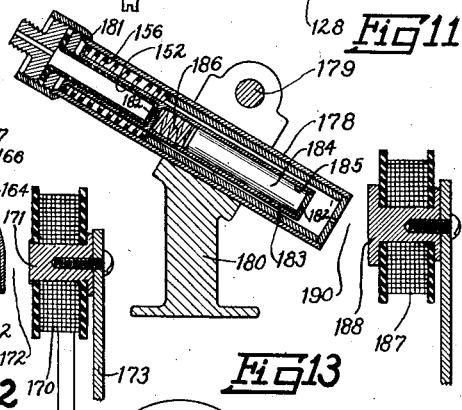
Fig 13
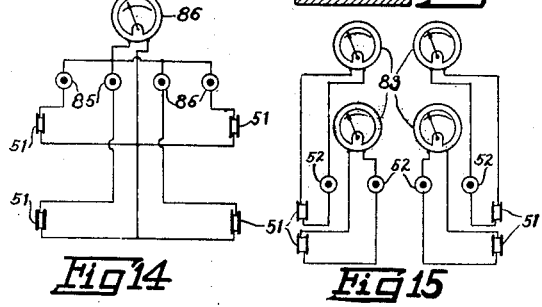
Fig 14      Fig 15
INVENTOR.
Dale S. Cole.
Sloughand Canfield
ATTORNEY.

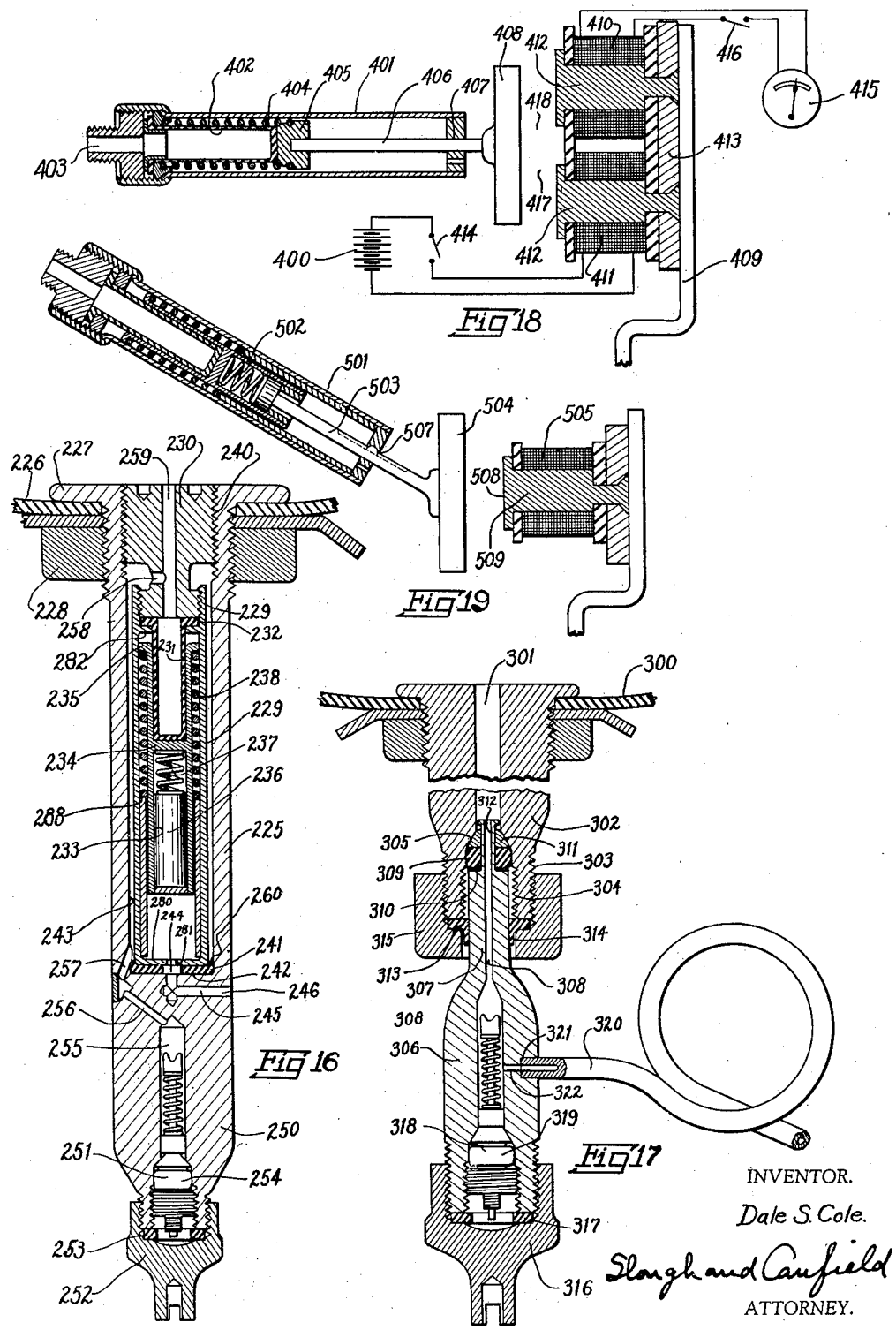

Patented Oct. 13, 1936

2,057,556

UNITED STATES PATENT OFFICE 2,057,556

TIRE INDICATING MEANS AND METHOD

Dale S. Cole, Cleveland Heights, Ohio

Application April 8, 1932, Serial No. 604,034

22 Claims. (Cl. 177—351)

This invention relates to methods and means for indicating at a point remote from a vehicle pneumatic tire, the pressure of the air therein.

Heretofore numerous attempts have been made to indicate on automotive vehicles or the like the air pressure in the tires thereof and to effect the indication at a point remote from the tire such, for example, as on the instrument board of the vehicle.

In various proposed schemes for this purpose, an electric instrument has been employed, and some means has been provided on the wheel, associated with the tire, and responsive in some manner to variations of tire pressure, to control an electric circuit connected to the instrument mounted on the instrument board.

In all of these proposed means and methods, it has been contemplated to effect the instrument indication while the vehicle is in motion and therefore to indicate to the vehicle operator that the pressure in a tire or tires is decreasing due to a puncture or to a leak, so that a suitable repair to the tire may be made before the decreased pressure damages the tire, or to indicate that the pressure is increasing excessively due, for example, to a rise of temperature, so that the pressure may be adjusted before damage to the tire may result.

In one class of such proposed method and means, an electric circuit is established and maintained between the pressure responsive means associated with the tire and the body of the vehicle, through a sliding contact construction.

In another class of such method and means, an electric circuit is established intermittently between the rotating tire and the vehicle body or chassis by the periodic engagement of circuit closing switch elements, one of which rotates with the wheel and the other of which is relatively stationary on the chassis.

In another class of such means and methods, a mechanism is operated by the mutual engagement of a rotating element on the wheel or tire and an associated element on the chassis.

In all such schemes, the mechanical engagement of a rotating element on the wheel and a stationary element on the chassis, whether to function electrically or mechanically, has the serious defect that the mutually engaging elements rapidly wear and deteriorate, and, in the case of the electrically functioning mutually engaging elements, lose their electrical conductivity due to the accumulation of dust etc., with the result that they cannot be relied upon to function to effect the desired result for any length of time after being installed.

With these practical objections and defects of prior means and methods for this purpose, it is an object of my invention to provide generally a method and means for indicating at a convenient point on a motor vehicle, such for example, as the instrument board, the air pressure of the tires thereof and to effect the indication without mutual engagement, mechanical or electrical, between any portion of the rotating wheel or tire and the relatively stationary chassis or body of the car upon which the instrument board is mounted.

Another object is to provide such a pressure indicating means and method in which an electrically energized indicating instrument may be employed.

Another object is to provide such a means and method for indicating tire pressure which may either be installed in an automotive vehicle at the time of building the vehicle, or may be attached as an accessory to vehicles already otherwise completely constructed.

Another object is to provide a tire pressure indicating method and means wherein a separate instrument may be employed to indicate the pressure of each tire, and which instruments may be simultaneously actuated or individually selectively actuated and in either case continuously or momentarily at the will of the vehicle operator.

Another object of my invention is to provide an improved tire pressure indicating method and means whereby a single indicating instrument may be employed to indicate, by suitable operative selective means, the tire pressure of each of the tires at the will of the operator.

Another object is to provide an electric system of indication of vehicle tire pressure deriving its electrical energy from the forward movement of the vehicle.

Another object is to provide an electrical indicating system and apparatus for indicating vehicle tire pressure and which derives its electrical energy from the forward movement of the vehicle, and in which the tire pressure indication may be effected independently of the speed of the forward movement of the vehicle.

Another object is to provide, for use in a tire pressure indicating system, an improved construction of tire valve stem.

Another object is to provide in a tire pressure indicating system and apparatus, adapted to derive its functioning energy from the forward motion of the vehicle, a means for calibrating the indication.

Another object is to provide generally an improved method and means for indicating the tire pressure of an automotive vehicle while the vehicle is in motion.

Another object is to provide an improved tire pressure indicating method and means of the type in which pressure communication with the tire interior may be made through the tire filling valve stem, and in which such communication may be effected in a manner not to change or interfere with the customary operation of inflating the tire through the stem.

Other objects will be apparent to those skilled in the art to which my invention appertains.

My invention is fully disclosed in the following description taken in connection with the accompanying drawings, in which:

Fig. 7 is a view generally similar to a part of Fig. 3 but showing a modification;

Figure 3:
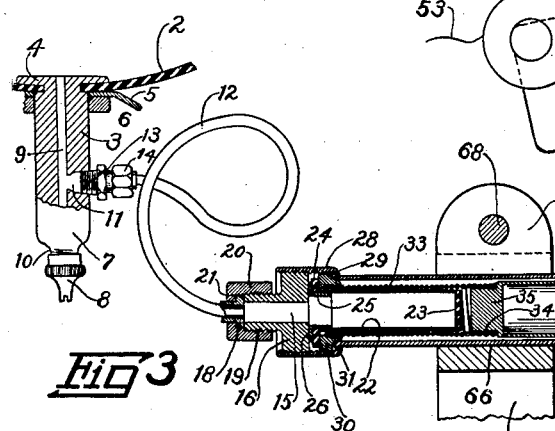
Fig. 3 is a view, to an enlarged scale, approximately full size, of some of the essential parts of Fig. 1.

Figs. 8, 9, and 10 are views similar to Fig. 7 showing other modifications;

Fig. 11 is a fragmentary view to an enlarged scale of a part of Fig. 10;

Figs. 12 and 13 are views generally similar to Fig. 3 but showing other modifications;

Figs. 14 and 15 are diagrams of electrical circuits which I may employ in the practice of my invention;

Fig. 16 is a view similar to a part of Fig. 8 showing a modification.

Fig. 17 is a view similar to a part of Fig. 3 but showing a modification;

Figs. 18 and 19 are views similar respectively to Figs. 3 and 13 but showing modifications.

Referring to the drawings, particularly Figs. 1 to 4 inclusive, I have shown generally at 1 the pneumatic tire of an automotive vehicle and at 2 the well-known inner tube thereof, provided with a valve stem 3. The valve stem, as illustrated in Fig. 3, may be secured to the inner tube 2 in the well-known or any other suitable manner, as for example by a head 4 internally of the tube and a plate 5 and nut 6, in the well-known construction.

In the outer end of the valve stem 3 may be provided, in the portion indicated generally at 7, the usual or any suitable "valve insides", these parts being too well known to require illustration, and the valve stem 3 may have the usual sealing cap 8. A duct 9 communicates with the interior of the tire or tube and with the threaded neck 10 and portion 7 containing the valve whereby, upon moving the cap 8, air under pressure may be admitted to the tire tube 2, in the usual well known manner.

The stem 3 is provided with a laterally extending branch duct 11 communicating with the duct 9, and communicating with an external tube 12, which may be sealed air-tight to the stem 3 by a plug 13 threaded into the side of the stem and a gland construction 14 connected therewith.

Figure 1:
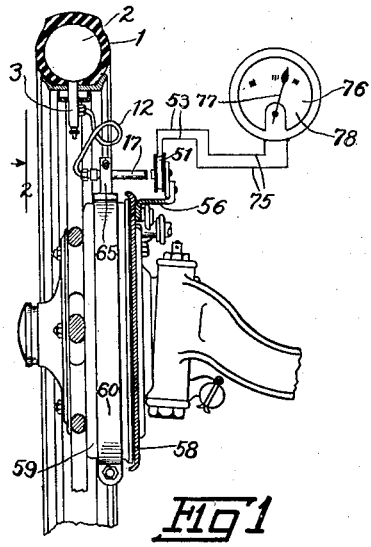
Fig. 1 is a view partly in cross-section of an automotive vehicle wheel and tire, and illustrating one embodiment of my invention applied thereto, and an electric circuit associated therewith for indicating pressure of the tire.

The other end of the tube 12, which, as shown in Figs. 1 and 3, is preferably bent into one or more convolutions, communicates with the bore 15 on a head 16 forming part of a sealed magnet housing 17. To effect a seal between the tube and the head 16, the tube may have a flange terminus element 18 and the head 16 may have a reduced threaded neck 19 upon which is screwed a clamping nut 20 having an inwardly directed flange 21 to engage the element 18 and clamp it against the end of the neck 19 in an air-tight manner.

The bore 15 communicates with the interior of a rubber bag 22 generally of thimble shape having a closed end 23, and an outwardly directed flange 24 at its open end, the communication with the bag being through a short tubular element 25 having an outwardly directed flange 26. The flange 26 rests on the inner termination of the head 16; the flange 24 of the bag 22 rests on the flange 26, the wall of the bag being telescoped with respect to the wall of the tubular element 25. The bag flange 24 and the flange 26 are sealingly compressed upon the head 16 by a generally tubular nut 28 threaded on the head 16 and having an inwardly directed flange 29 to exert an axial compressive thrust on the flange 24 and 26 when it is screwed toward the left on the head 16; and a packing ring 30 together with a flange 31 of a housing wall 32, to be referred to, may be interposed between the flange 29 of the nut 28 and the flange 24 of the bag. Upon screwing the nut 28 toward the left, as viewed in Fig. 3, the parts just described including the flange 31, packing element 30, flange 24 of the bag, and the flange 26 may all be rigidly connected together, and the open end of the bag 22 sealed with respect to the bore 15.

The packing element 30 is preferably made of metal and whereas, as illustrated, it is of annular form, and surrounds the bag 22, its internal diameter is larger than that of the bag. Internally, the annular element 30 is threaded and into the threads thereof are screwed the convolutions of a helically wound spring 33. One end of the spring 33 is thus anchored or rigidly connected to the element 30 and thus is immovable relative to the flange end of the bag 22. The spring 33, as stated, surrounds the bag 22, and towards the right, as viewed in the figure, extends beyond the end 23 of the bag and is screw-threaded upon threads 34 on the head 35 of a magnet shell 36. The shell 36 comprises a cylindrical tubular wall 37 closed at one end by the head 35 and at the other by the end portion 38. Within the shell 36 is a permanent magnet 40 preferably completely filling the shell 36 and therefore of elongated cylindrical form.

As is well known, with respect to permanent magnets of this general shape, there will be approximately at the point 41, a magnet pole from which magnetic lines of force will extend generally axially from the cylindrical magnet 40 outwardly through the end portion 38 of the shell. The wall 37, head 35, and end portion 38 of the shell are preferably all rigidly connected together, or formed integrally with respect to portions thereof. The housing 17 is closed at its right hand end, as viewed in Fig. 3, by an end portion 42, and a small perforation 43 may be provided in the end portion 42 for the passage therethrough of air to equalize the internal and external air pressure within the housing 17.

From the foregoing described construction, it will now appear that pressure within the tire tube 2 may be communicated through the duct 9, tube 12, bore 15, to the bag 22 and may expand the bag. The bag being enclosed within the spring 33 will expand axially, the closed end 23 moving toward the right, and engaging the head 35 of the shell 36, and then will move, upon further expansion of the bag, the shell 36 and the magnet 20 therewithin, the movement continuing until the tension of the spring 33 balances the air pressure in the bag 22. The parts are so proportioned that at a given normal pressure such for example as 35 pounds to the square inch, the polar end of the magnet 40 will be moved into proximity to the end 42 of the housing 17, and as long as that pressure obtains will remain at that position. Upon a decrease of pressure in the tire, the spring 33 will retract and draw the magnet 40 correspondingly to a new position towards the left and vice versa upon an increase of pressure above the normal 35 pounds.

At 45 I have illustrated an armature winding disposed on a spool comprising insulating heads 46—46 and a ferrous core 47 which may be provided with a flange 48 for clamping the head 46 and the winding 45 upon an armature base 49, the core 47 being secured to the base by a screw 50 projected through a suitable perforation in the base 49 and threaded axially into the core.

Figure 4:
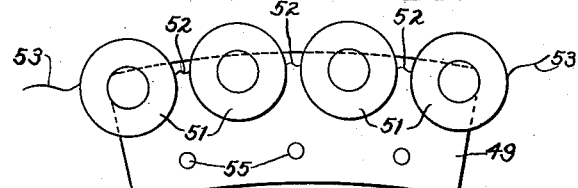
Fig. 4 is a fragmentary view taken approximately from the plane 4 of Fig. 3, and drawn to a slightly smaller scale than that figure.

As illustrated in Fig. 4, I preferably provide a plurality of such armature windings indicated generally at 51—51, four being shown in the drawings and connect the windings 45 thereof all in series by connecting wires 52—52 and provide external terminals 53—53 for the series of windings.

The armature base 49 is provided with one or more perforations 55 whereby it may be rigidly secured upon a supporting bracket 56 by bolts 57. The bracket 56 is illustrated in Fig. 1 and may be rigidly and permanently connected to the non-rotating annular portion 58 of the wheel brake housing, the same being illustrated in broken lines in Fig. 3.

The armature winding 45 and ferrous core 47 thereof are thus supported non-rotatively with respect to the wheel axis and with the axes of the several core portions 47 generally parallel to the wheel axis.

By supporting the armature windings in this manner upon the non-rotating portion of the brake drum, a similar construction of armature and armature support may be provided for each of the wheels, front and rear, and in the case of the front wheels, the armature core axes will be generally parallel to the wheel axis at all steering portions of the wheel.

The field magnet housing 17 however rotates with the wheel and to this end is secured to the rotary element of the brake housing 59 by the following construction. A strap 60 of sheet metal in the form of a clamp encircles or embraces the brake drum 59 and is clamped thereupon by a bolt or bolts 61 projected through perforations in flanges at 62—62 at the ends of the strap 60. Intermediate of the ends of the strap a head 65 is secured thereto extending radially from the brake drum 59 when the strap is clamped thereon.

The head 65 has a bore 66 therein disposed generally parallel to the axis of the wheel and has a pair of jaws 67—67 and a bolt 68 therethrough. The field magnet housing 17 is projected through the bore 66 and upon drawing the bolt 68 tight, the jaws 67 clamp the field magnet housing 17 in the head 65 in a well known manner.

The position of the housing 17 may be adjusted axially thereof by loosening the bolt 68 and sliding the housing 17 in the bore 66 and retightening the bolt 68.

The parts above described are proportioned and relatively disposed so that the end portion 42 of the housing 17 is spaced from and confronts the face of the core 47 and so that at the above referred to normal pressure of 35 pounds per square inch, the end of the magnet 40 will be spaced a suitable predetermined distance, such for example, as three-eighths or one-half inch from the face of the core 47.

By supporting the housing 17 upon the rotary portion of the brake drum, similar supports and housings may be provided on all wheels, front and rear, and in the case of the front wheels, the axes of the housings may be parallel to the wheel axis and parallel to the axes of the armature cores above described, at all steering positions of the wheels.

As will now be understood, in operation, the magnet 40 rotates with the wheel and maintains a position substantially parallel to the wheel axis. The magnetism emanating from the pole 41 of the magnet bridges the gap 70 between the magnet and the core 47, flows through the core and thence finds its way by air back to the magnet 40 and in its course threads the winding 45. As the wheel rotates, the magnetism sweeps across the armature windings 51—51 one after the other and generates therein an electromotive force the value of which varies with the speed of the vehicle and with the length of the air gap 70. By means of conducting wires 75—75, Fig. 1, connected to the terminals 53 of the windings, an electrically actuatable indicating instrument 76 may be energized by the electro-motive force thus developed.

As will be apparent, the voltage generated will comprise a succession of groups of impulses, one group for each revolution of the wheel. I therefore prefer to employ an instrument 76 which will not only be responsive to relatively small voltages or currents, but which will be relatively "dead beat", that is to say, an indicating needle 77 thereof will take up a position on a dial 78 corresponding to the average or effective value of the pulses of current.

It is believed that those skilled in this art will understand how to construct or provide an instrument which will be "dead beat" in these respects.

Figure 5:
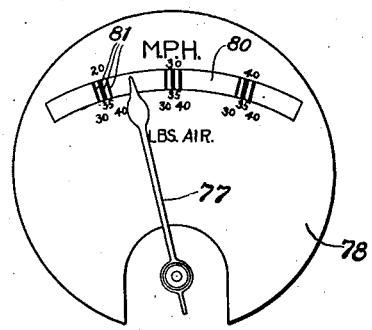
Fig. 5 is a view of one form of an indicating instrument dial, which I may employ.

In Fig. 5 I have shown one form of a dial 78 which I may employ. In connection with this dial, the needle 77 indicates on a scale 80, three general positions, each position representing miles per hour at which the vehicle is moving forward, as indicated by the legend "M. P. H." and the numerals "20", "30" and "40". At each of these speed indicating portions there are three lines, such as the lines 81—81 for the speed 20 miles per hour; and the three lines 81 represent respectively 30, 35 and 40 pounds pressure per square inch, as indicated by the legend "Lbs. air" and the numerals "30", "35" and "40".

In the use of an instrument with such a dial, the driver of the vehicle may set the speed of the vehicle, by means of the usual speedometer, to 20 miles an hour for example, and the position of the needle 77 with respect to the air pressure insignia above referred to will indicate the pressure in the tire, by its proximity to one or the other of the air pressure indicating insignia; or the operator may set the car speed at 30 miles per hour or 40 miles per hour as he may desire and read the tire pressure at either of these speeds.

When the indicating apparatus and system above described is first installed, it may be calibrated to correctly indicate the pressure as just referred to by adjustably positioning the field magnet housing 17 in the clamp head 65, that is by shifting it in one direction or the other axially, to vary the air gap 70; and with the desired pressure in the tire by finding the position for the housing 17 at which, for one of the three indicating speeds, the needle 77 will indicate the said tire pressure.

Thereafter as will be understood, if the air pressure decreases due to a puncture or a leak, the air bag 22 in the housing 17 will be contracted by the spring 33 causing the armature 40 to increase the gap 70 and generally reduce the voltage and cause the needle 77 to take up a position to indicate a reduced air pressure; and vice versa to decrease the gap 70 and increase the voltage in the case of an increase of pressure which may result from a rise of temperature.

Figure 6:
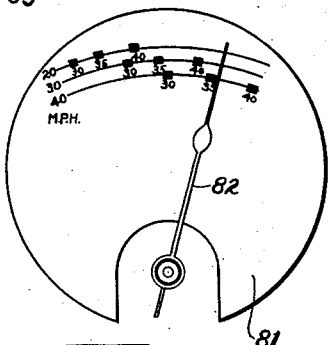
Fig. 6 is a view similar to Fig. 5 showing a modification.

With respect to the dial 81 shown in Fig. 6, the needle 82 may move over three scales, each indicated by a legend having the significance of 20, 30 or 40 miles per hour, and at any one speed such, for example, as 20 miles per hour, the needle 82 will indicate by the numerals "30", "35", or "40" on the corresponding scale the pounds pressure per square inch of air in the tire.

Thus in connection with the apparatus thus far described, I have provided, generally speaking, an electric generator for generating a voltage which varies with the speed of the car and with variations of air gap caused by variations of tire pressure and have provided an instrument and dials therefor by which at any one of several suitable selective car speeds, the variations of tire pressure which may occur may be indicated.

According to the diagram of electrical connections in Fig. 1, the instrument 76 is always connected to the energizing circuit. Such an instrument and associated apparatus may be provided for each of the tires of the car and all of the instruments assembled in a convenient group on the instrument board of the car.

If desired, the several instruments may normally be disconnected from the energizing circuits and therefore normally de-energized and may be momentarily energized by the driver of the car at any time he may wish to inspect the tire pressure of any individual tire. In such a case the electrical system may be that shown in Fig. 15. In that figure, four instruments 83—83 are shown and each instrument is connected in series with an armature 51 and with a push button or switch device 52—52. Upon closing any one of the push button switches 52, one of the instruments correspondingly will be energized by a corresponding armature of one of the tires to indicate the pressure in the tire.

Or, where only one instrument is employed, the arrangement of Fig. 14 may be used. In this diagram, upon closing any one of the push button switches 85—85, a circuit is established including in series the push button itself and a corresponding one of the armatures 51 and the instrument 86 whereby the tire pressure of the individual tires may be indicated on the instrument 86, selectively at the will of the driver.

Figure 2:
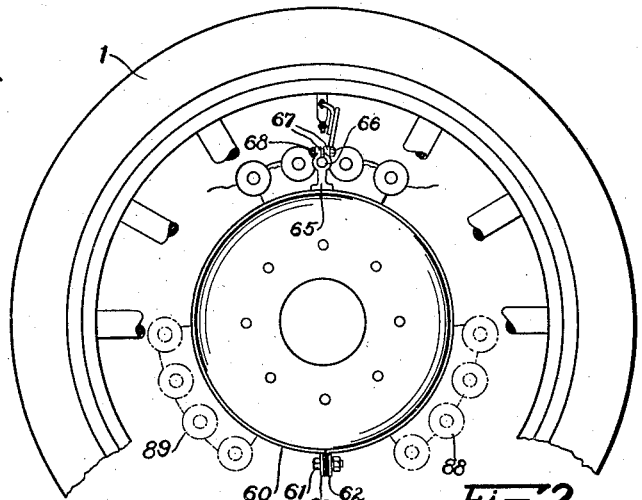
Fig. 2 is a view in simplified form taken approximately from the plane 2 of Fig. 1 and with parts back of the plane of the view omitted for simplicity.

In Fig. 2 I have illustrated at 88 and 89 two other groups of armatures, four in each group. Thus three groups of armatures may be distributed around the axis of the wheel to cause a more nearly continuously pulsing current to be generated and/or to increase the average effective value of the voltage available to energize the indicating instrument. Obviously if desired, a continuous circle of armatures 51 may be employed. On the other hand, however, where a sensitive, dead-beat instrument is available, a single armature, giving one pulse cycle per wheel revolution, may be used.

In Figs. 7 to 10 inclusive, I have shown various modifications in which the field magnet is supported on the tire valve stem instead of on a portion of the brake housing 59, or a part of the wheel proper.

In the modification of Fig. 7, the stem shown generally at 90 comprises a portion 91 secured directly to the inner tube 92 and an outer portion 93 screw-threaded to the portion 91 as at 94. A duct 95 in the portion 91 communicates with a duct 96 in the portion 93, the portion 93 being provided with the valve containing portion 97 and the sealing cap 98 and the duct 96 having a branch 99 therefrom. The duct branch 99 communicates with the interior of a cylinder portion 100 in which a reciprocable piston 101 is disposed and to which is attached a magnet 102. The stem portion 93 and cylinder portion 100 may be conveniently formed integrally. A compression spring 103 may be disposed at the opposite end of the magnet 102 from the piston 101 and abut at one end upon the magnet and at the other end upon the closed end of the cylinder portion 100 to exert pressure on the magnet in opposition to the air pressure in the cylinder.

An increase of pressure in the inner tube 92, as will now be understood, will move the piston 101 toward the right as viewed in Fig. 7 against the tension of the spring 103 and a corresponding decrease of pressure will enable the spring to push the piston toward the left, these movements correspondingly moving the magnet 102, and thus the magnet will be caused to take up a position longitudinally in the cylinder portion 100 corresponding to the tire pressure.

An armature winding 104 on the closed end of a U-shaped core 105 is mounted laterally of the magnet 102 with the core pole ends 106 opposite the side of the magnet 102. Thus there are provided two air gaps 107—107 for flux emanating from opposite ends of the magnet 102.

In the operation of the modification of my invention of Fig. 7, the magnet 102, rotating with the wheel, will at each revolution thereof project its flux across the gaps 107 and through the core 105 threading the winding 104 and generating electro-motive force therein. A change of pressure in the tire 92 will change the longitudinal position of the magnet 102 and correspondingly change the reluctance of the air gaps 107—107 and therefore the value of the voltage generated, and will correspondingly indicate the tire pressure change on a gauge 108.

In the modification of my invention shown in Fig. 9, the valve stem 110 has an extension shown generally at 111, screwed as at 112 laterally into the stem 110, and the main duct 113 of the stem communicates with the interior of the extension 111. The said extension comprises a base portion 114 generally of tubular form with a flange 115 at its outer end; and comprises a magnet housing portion 116, also generally tubular and having a corresponding flange 117. Between the flanges 115 and 117 is sealedly mounted a diaphragm 118 preferably of metal. The juncture of the flanges 115 and 117 and diaphragm 118 may be soldered in a well known manner.

Secured to the center of the diaphragm 118 is the inner end of a generally cylindrical permanent magnet 119, the magnet extending generally axially of the housing 116. The end of the housing is closed by an end wall 120. The diaphragm 118 is preferably inherently resilient and an increase of air pressure in the tire 121 and communicated to one side of the diaphragm by way of the duct 113 will move the magnet 119 outwardly in the extension 111. A reduction of pressure will correspondingly permit the diaphragm 118 to retract and draw the magnet 119 back in the extension away from the end 120. An armature winding 122 is provided having a central core 123 and branch cores 125—125 formed by the cylindrical skirt of a cup-form element 125' and the annular extremity of the skirt may provide poles 126—126 and the control core 123 may provide a pole 124. Such a magnetic circuit presents the well known E form in cross-section.

The armature winding and its cores may be supported upon a portion of the chassis such as the brake housing as has been described hereinbefore in connection with the other forms.

In operation of the form of Fig. 9, the end of the magnet 119 rotating with the wheel sweeps past the poles 124 and 126 and generates voltage in the winding 122, the value of the voltage being dependent upon the speed of rotation of the magnet and the length of the air gaps between the end of the magnet and the poles 124 and 126. The length of these air gaps will, of course, be changed as the pressure in the tire 121 changes as will now be clear and will effect indication on a suitable instrument now shown.

In Fig. 10 another modification of my invention is illustrated. This form is generally similar to that of Fig. 9 except that the magnet 127 is moved longitudinally in the housing 128, responsive to changes of pressure in the tire 129, by means of a bellows type diaphragm 130, one end of the bellows communicating interiorly with a duct 131 communicating with the main duct 132 of the valve stem 133, and the other end of the bellows being closed and movable responsive to changes of pressure within the bellows transmitting its movement to the magnet 127.

In this form also, a still further modification of magnetic circuit is shown for the armature winding 136. This magnetic circuit comprises a core 137 within the winding 136 and a branch core 138 extending therefrom generally parallel to the core 137 and having at its extremity an inwardly directed portion 139. Two air gaps are thus provided, one at 140 between the core 137 and the end of the magnet 127, and the other at 141 between the end of the branch 139 and a side portion of the magnet 137.

The core branch 138—139 provides a suitable return path for the flux. The gap 141 is not changed materially by longitudinal pressure-responsive movement of the magnet 127, the greater part of the voltage change due to change of pressure being effected by changes of the gap 140.

In this connection it will be understood that the bellows 130 may be inherently resilient and thereby will be caused to be extended axially upon an increase of pressure or to contract axially upon a decrease thereof.

In either of the forms of Figs. 9 or 10, a spring similar to spring 103 of Fig. 7 may be employed to retract the magnet upon a decrease of pressure.

In Fig. 10 I have indicated in dotted lines at 143, a core branch similar to branch 138 and if desired, both branches 138 and 143 may be employed. Such an arrangement has the advantage that the lateral magnetic pull in the gap 141 on the magnet 127 is counter-balanced by corresponding equal pull in a gap 144 so that there is less liability that the pull in the gap 141 may draw upon the magnet 127 laterally and interfere with its free movement axially. Furthermore, when both branches 138 and 143 are employed, a magnetic circuit of very low reluctance is provided, inasmuch as a ferrous path for the flux is provided, everywhere except at the actual gaps 141 and 140.

In the forms of my invention thus far described, the voltage generated in the armature windings varies both with the speed of revolution of the wheel, and with variations of air pressure in the tire. In Fig. 12 I have shown another form of my invention in which the variation in voltage generated is in correspondence with changes of the tire pressure only, means which will now be described being provided to compensate for changes of velocity of rotation.

Referring to Fig. 12 the valve stem 150 has a tube 151 connected thereto in a manner similar to that shown in Fig. 3, and the tube communicates with the interior of a rubber bag 152 sealed in a head shown generally at 153 similar to the corresponding construction of Fig. 3. This construction comprises also a housing 154 corresponding generally to the housing 17 of Fig. 3, and the housing 154 is supported in a clamp head 65 which may be identical with that described in connection with Figs. 1, 2 and 3. In this form however, the shell 36 of Fig. 3 is replaced by a carrier 155 having a generally tubular portion 156 terminating at one end, the left end as viewed in the figure, in a flange 157. The bag 152 is disposed within the tubular portion 156. A compression spring 158 surrounds the tubular portion 156 and abuts at one end upon the flange 157 and at the other end upon an internally directed flange 160 of the housing 154. The carrier 155 has a transverse partition 161 against which the closed end of the bag 152 may abut, and to the right of the partition 161 the carrier has a horizontally extending bracket 162 and an upwardly outwardly extending arm 163. A magnet 164 rests upon the bracket 162 and is pivoted thereto adjacent to its inner end as at 165. A compression spring 166 abuts its lower end upon the upper side of the magnet 164 and at its upper end abuts upon the end of an adjusting screw 167 threaded in the arm 163. By turning the screw 167, the tension of the spring 166 may be adjusted in a well known manner.

The housing 154 is formed to completely enclose the parts thus far described and is provided with a screw 168 in a wall thereof to give access, upon the removal of the screw, to the adjusting screw 167.

An armature winding 170 having a central core 171 is disposed with the end of the core opposite the end of the magnet 164 providing an air gap 172. The armature winding and core may be supported in any suitable manner by a bracket 173.

In operation of the form shown in Fig. 13, the magnet 164 will take up a position longitudinally thereof in correspondence with the pressure in the tire, which pressure communicated to the interior of the bag 152 by the tube 151 and valve stem 150, will expand the bag, and reacting upon the transverse partition 161 will move the carrier 155 against the tension of the spring 158 to determine a corresponding length of air gap 172. Upon rotation of the wheel and the magnet 164 therewith, voltage will be generated in the winding 170. The housing 154 may be adjusted axially in the head 65 by the screw 175 as has been described in connection with the form of Fig. 3, so that at some predetermined minimum speed such as 20 miles an hour, the voltage generated in the winding 170 will move the pointer 176 to indicate the tire pressure which, in the case under consideration, and as shown on the dial 177 of Fig. 13, is 35 pounds per square inch.

The spring 166 is now adjusted by means of the screw 167 until at the said predetermined speed of 20 miles an hour, the centrifugal force acting upon the magnet 164 tending to rotate it around its pivot 165 against the tension of the spring 166 will substantially exactly balance the tension of that spring.

If now the vehicle speed increases beyond 20 miles an hour, it will accordingly cause the magnet to rotate and compress the spring 166 and thus increase the effective length of the air gap 172, compensating for or preventing, any increase of voltage in the winding 170 which would otherwise occur in response to the increased speed. As a consequence, the indicating finger 176 will remain upon the indication of 35 pounds per square inch.

Thus by the employment of a suitably calibrated spring 166, the magnet 164 will be caused to take up a position corresponding to all of the speeds above the predetermined speed whereby the indicating finger will indicate the same position on the dial at all speeds of the vehicle. At the same time, a change of pressure resulting in a movement of the magnet to increase or decrease the gap 172, will cause a corresponding change of indication on the dial.

Thus a dial 177 with a single scale and indicating only pounds per square inch may be employed with the modification shown in Fig. 12.

In Fig. 13 I have shown another modification to accomplish the purposes of the form of Fig. 12. In this form, the bag 152 and spring 156 of Fig. 12 are employed. A housing 178 is clamped by a screw 179 in a head 180 with the axis of the housing inclined at an angle to the horizontal. A shell 185 having a flange 181 and a transverse partition 182, and a closed end 182', is constrained to move forwardly in the housing 178 by air pressure in the bag against counter pressure of the spring 156 similarly as in Fig. 12.

Beyond the partition 182, the shell has a tubular portion 183 in which a magnet 184 is disposed one end abutting upon the closed end 182 and slidable axially toward the partition 182 against a compression spring 186 placed between the other end of the magnet and the partition 182. An armature winding 187 has a core 188 whereby an air gap 190 is provided between the end of the magnet 184 and the core 188.

In the operation of the form of Fig. 13, air pressure in the bag 152 will move the shell 185 to position the magnet 184 to correspondingly provide a suitable air gap 190 whereby at a predetermined velocity of revolution, the air pressure in the bag 152 will be indicated on an indicator such as that shown in Fig. 12.

At an increase of velocity, centrifugal force acting on the magnet 184 will cause it to move upwardly along the inclination of the shell 185 and compress the spring 186 correspondingly increasing the gap 190 to compensate for the increased voltage which otherwise would occur.

Thus in the form of Fig. 13 as well as that in Fig. 12, the dial finger will indicate a constant value for the tire pressure at all speeds of the tire or wheel.

In Fig. 8 I have shown still another form of my invention in which compensation for velocity is effected.

In this form, a housing 200 similar to the housing 178 of Fig. 13 is provided and having a magnet 184, spring 186, spring 156, and bag 152 similar to the corresponding parts of Fig. 13. The housing 200 is connected to an elbow 201 screwed as at 202 into the valve stem 203, the main duct 204 of the stem communicating by means of a duct 205 in the elbow, with the interior of the bag 152. The axis of the housing 200 is in this instance generally radially disposed with respect to the wheel. An armature winding 206 and a core of U shape 207 are provided similar to the corresponding parts of Fig. 7 hereinbefore described. Thus there are two air gaps 208—208 between lateral portions of the magnet 184 and the core 207.

The core 207 and magnet 184 are respectively relatively disposed so that at a speed of say 20 miles per hour, and air pressure in the bag 152 of 35 pounds to the square inch, the flux emanating from the magnet and crossing the air gaps 208—208 will generate in the winding 206 a voltage sufficient to indicate on an instrument dial such as 177 the said pressure. An increase of pressure in the bag 152 will correspondingly move the magnet 184 downwardly as viewed in the drawing to reduce the reluctance of the air gaps 208—208 and effect the correspondingly higher pressure indication, and vice versa.

Upon an increase of speed above the predetermined speed, centrifugal force acting on the magnet 184 will cause it to move outwardly radially, compressing the spring 186 and increasing the reluctance of the air gaps to compensate for the increase in speed.

In each of the modifications illustrated in Figs. 7 to 13 inclusive, the outer wall of the shells or chambers 100, 200, 111, 128, 154, and 178, respectively, may be provided with a small perforation corresponding to the perforation 43 in the housing 32 of Fig. 3, whereby the interior of the shell or chamber may be maintained at atmospheric pressure and to permit egress and ingress of air upon expansion and contraction of the rubber bag, or movement of the piston or diaphragm as the case may be in the various modifications.

In the modification shown in Fig. 16, I have illustrated a construction whereby the entire magnet-positioning mechanism may be embodied in the tire valve stem. The stem proper 225 is associated with the inner tube 226 in the usual well known manner by a head 227 internally of the tube and a nut 228 threaded on the stem externally of the tube.

A cylindrical housing 229 is closed at one end as at 230 and has a perforation 231 substantially centrally of the end. At its opposite end, the housing 229 is interiorly threaded upon a head 230; and a rubber bag 231 has a flange 232 thereof, sealedly clamped between the head 230 and an interiorly directed flange 282 of the housing. A shell 233 having a transverse partition 234 and an outwardly extending flange 235 houses a magnet 236, centrifugal force spring 237 as in the forms described hereinbefore, and a spring 238 abutting upon the flange 235 and upon a shoulder 288 in the housing 229, opposes expansion of the bag 231.

The head 230 is screw-threaded as at 240 into the stem proper 225 and its inward screwing movement is adapted to force the end 230 of the housing upon a sealing washer of rubber or like material 241 disposed between the end 280 of the housing and a transverse bottom 242 of the bore 243 in which the housing 229 is telescopically disposed.

The sealing washer 241 has a central perforation 244 communicating with the perforation 281, and with a duct 245 formed in the stem proper 225 and communicating as at 246 with the atmosphere.

The outer end portion 250 of the stem is provided with the usual valve inside 251, sealing cap 252, whereby upon removing the cap, the usual tire filling means may be applied to the end of the stem and upon applying the cap the end of the stem may be sealed by the sealing washer 253, in addition to the seal effected by the sealing washer 254 of the valve insides.

The duct 255 in which the valve insides are disposed in the usual manner, communicates by ducts 256 and 257 with the bore 243 of the stem externally of the housing 229, and adjacent the head 230, the said bore 243 communicates by a laterally extending duct 258 with a duct 259 extending through the head 230 and communicating with the tire interior and the interior of the bag 231.

In the operation of the form of my invention illustrated in Fig. 16, the stem construction may serve to inflate the tire in the usual manner, air being admitted through the valve insides at 251, and by way of the ducts 256 and 257, bore 243, ducts 258 and 259 to the interior of the tire. The tire pressure is communicated to the bag 231 and expands the same, positioning the magnet 236 longitudinally of the stem in a position corresponding to the tire pressure; and upon its expansion air within the housing 229 may escape to the atmosphere through the duct 245, and vice versa upon contraction of the bag, whereby the position of the magnet 236 will be uninfluenced by internal pressure. At the same time, the bore 243 which communicates with the interior of the tire is sealed from communication with the atmosphere by the packing washer 241 which, being compressed upon the surface 242 not only circumferentially seals the perforation 281, but seals the entire end 280 of the housing 229 and, being crowded into the bore 243 as at 260, effects a circumferential seal of the bore 243.

It is believed that it will be understood, without further illustration or description, that a stationary armature such, for example, as that illustrated in Fig. 8, may be disposed on the chassis laterally of the magnet 236, and that voltage will be generated therein in accordance with the position of the magnet 236; and that different speeds of rotation of the vehicle wheel carrying the stem will be compensated for by the action of centrifugal force on the magnet 236 as more fully decribed hereinbefore with the other form.

In the form of my invention illustrated in Fig. 3 and in some of the other forms, I illustrate one mode of effecting communication between the magnet-position-controlling bag and the interior of the tire. For example, in Fig. 3 this is effected by a tube 12 communicating with the side of the valve stem. Inasmuch as it is common practice in tire valve stem constructions to employ what is known as a "double seal", illustrated by the double seal at the filling end of the ordinary stem, I have provided in the modification of Fig. 17 a construction wherein double seal may be effected in the practice of my invention.

Referring to Fig. 17, I have shown at 300 the usual tube, communicating with which is the duct 301 of a stem proper 302, having the usual external threads 303 for the reception of the filling cap, the usual internal thread 304 for the valve insides, and the tapering shoulder 305 upon which the valve insides react. Thus the stem proper 302 may be contructed identically with or similar to the well known stem.

When it is desired to apply my invention to such usual stem constructions, I provide an auxiliary stem portion 306 having a reduced shank 307 provided with an axial duct 308 and on its extreme end having a valve washer 309 disposed between a shoulder 310 on the stem 307 and an annular element 311 rotatable on a neck portion 312 of the stem 307.

A sealing washer 313 having a collar portion 314 is permanently secured upon the stem 307, preferably by vulcanizing the collar portion 314 upon the stem. The washer 313 is adapted to cover the end of the stem proper 302 and to be sealingly compressed thereupon by a nut 315 on the thread 303.

The parts are so constructed and relatively disposed that upon screwing on the nut 315, an airtight seal will be effected between the washer 309 and duct 301, and also an air-tight seal will be effected between the washer 313 and the threaded end of the stem 302. Thus a double seal is provided substantially the same as the double seal effected on an ordinary tire valve stem by the valve washer and the filling cap washer.

The auxiliary stem portion 306 is preferably disposed coaxial with the stem proper 302 and at its outer end is provided with the usual filling cap 316, washer 317 therein, and valve insides 318 whereby upon applying the cap 316, a seal will be effected between the washer 317 and the end of the stem portion 306, thus sealing the duct 308; and a second seal is made by the valve washer 319 of the valve insides 318 in the usual manner. Thus at the outer end of the auxiliary stem portion 306 also is effected a double seal of the usual construction.

A metal tube 320 has an end seated in a bore 321 laterally of the duct 308 and communicates therewith by a laterally extending duct 322, and preferably the tube 320 is permanently and sealedly soldered or otherwise integrally secured in the bore 321 in an air-tight manner.

Thus by the construction of Fig. 17, a permanent seal is made between the tube 320 and the filling stem, and the tire tube 300 may be filled in the usual way by removing the cap 316; and the filling end of the stem may be removed by removing the nut 315 for purposes of changing the inner tube; and when replaced, the filling duct has a double seal, both at the outer filling end of the stem and at the juncture between the stem proper and the auxiliary stem portions.

In the forms of my invention hereinbefore described, the energy for actuating the indicating instrument has been generated in a winding by the relative movement of a sealed magnet such as a permanent magnet bar. In the forms of my invention illustrated in Figs. 18 and 19, the energy is supplied by the vehicle battery 400 whereby a less sensitive instrument and in some cases a cheaper instrument may be employed.

Referring to Fig. 18, I provide within the housing 401, an expansible bag 402 which, by means of the duct 403, may communicate with the tire interior and may be expanded against the opposing resilience of a spring 404, the construction in these respects being similar to that described in connection with Fig. 3. A head 405 is provided corresponding to the head 35 of Fig. 3 and secured to the head is a stem 406, which extends outwardly through a bore 407 in the wall of the housing 401 and externally carries a soft iron inductor element 408.

Upon a bracket 409 which may be secured on the chassis in a manner similar to that for the bracket 56 of Fig. 3, is mounted a pair of windings 410 and 411 each having a core 412—412 secured to a yoke 413.

The winding 411 is energized by the battery 400 through a control switch 414 and the winding 410 is connected to the indicating instrument 415 by a control switch 416.

In operation, the housing 401 moves with the wheel as will be understood from the forms hereinbefore described, and periodically therefor the inductor element 408 sweeps past the cores 412—412. In the absence of the inductor element 408, flux from the winding 411 completes its circuit to the yoke member 413 largely through the air, but in the periodic presence of the element 408, flux in the winding 411 jumps across the air gaps 417 into and through the inductor element 408 and across the air gap 418 into the core of the winding 410 to complete the magnetic circuit.

Thus a periodic flux is projected through or cut through the winding 410 and generates voltage therein in response to which the instrument 415 is energized.

The voltage will vary in correspondence to the length of the air gaps 417 and 418 which correspondingly is responsive to the pressure in the tire and in the bag 402 as will be understood.

Where a powerful magnet 411—412 is employed, relatively large voltage and current may be generated in the winding 410, the power coming from the battery 400 as will be understood.

In the form of my invention illustrated in Fig. 19, compensation is made for changes of speed by disposing the housing 501 at an angle and providing a spring 502. The construction of Fig. 19 corresponds to the construction of Fig. 13 in these respects, but instead of employing the magnet 184 of Fig. 13, a stem 503 carrying at its outer end an inductor element 504 is provided. Upon rotation of the wheel, the element 504 is periodically rotated past a pair of windings (one of which only at 505 is illustrated), one of the windings being energized by the battery and the other connected to an instrument as in Fig. 18.

In this respect it will be observed that Fig. 18 is a view so taken that the wheel axis about which the inductor element 408 revolves is directly behind the axis of the stem 406; whereas Fig. 19 is viewed with the wheel axis lower on the sheet than the inductor element 504, thus causing one of the windings 505 to be directly behind the other in the figure.

In the form of Fig. 19, a Woodruff key 507 may be provided to prevent relative rotation of the stem 503 to the housing 501 whereby to maintain the inductor element 504 constantly parallel to the face 508 of the core 509 of the winding.

In the foregoing description I have illustrated and described various means by which a flux producing magnet rotating with a wheel may generate current in a relatively stationary armature winding to actuate an indicating instrument, and in which the position of the magnet relative to the winding may be varied in correspondence to changes of air pressure in the tire to effect a corresponding change of generated voltage and instrument indication; and I have illustrated various forms of magnetic circuit for the armature winding and flux producing magnet as well as various means of applying the variable tire pressure to the magnet to change its position. I have also illustrated various means for compensating the generated voltage for the changes of velocity of the magnet resulting from changes of vehicle speed to cause the voltage generated to be responsive to variations of pressure independently of variations of speed.

While I have shown the armature winding as supported upon a relatively stationary portion of the brake housing, it will be understood that it may be supported elsewhere to provide the relative generating movement between it and the field flux.

Also, the head 65 which as described supports the magnet upon the rotary portion of the brake drum or housing, may be formed as an integral part or as a permanently attached part of the brake construction when the vehicle is built instead of being provided as an attachment as herein described. In either case, any off center weight of the head 65 may be counter-balanced by a suitable diametrically opposite weight; and in the case of the attachment form illustrated, such counter-balancing weight may be provided in the bolt 61 and flanges 62.

My invention is not limited to the exact details of construction shown and described. Many changes and modifications of the embodiment hereinbefore described and illustrated may be made within the scope and spirit of my invention without sacrificing its advantages.

I claim:

1. In an apparatus for indicating the air pressure of a vehicle wheel tire, an electro-responsive instrument for indicating tire pressure, an electric circuit for supplying electrical energy thereto, a relatively stationary means on the vehicle chassis and in the circuit, a device associated with the tire to rotate therewith comprising an element movable to different positions on the device and means for moving it responsive to changes of air pressure in the tire, the element being disposed relative to the tire so that rotation of the tire moves the element periodically into proximate spaced relation to the relatively stationary means and at different predetermined spaced distances therefrom corresponding to the different pressure responsive positions of the elements, the relatively stationary means being responsive to movement of the said element when in proximate spaced relation thereto to cause it to effect a change of energy to the instrument.

2. In an apparatus for effecting an indication of variable air pressure in a vehicle wheel tire, a generator for generating electric current driven by the motion of the vehicle and comprising a field element and an armature element, one on the wheel and rotatable therewith and the other on a relatively stationary portion of the vehicle, means responsive to variable tire pressure for causing the current generated to vary in correspondence with variations of tire pressure, and an indicating instrument responsive to the variations of the current generated and indicating tire pressure.

3. An apparatus as described in claim 2 and in which the means responsive to variations of tire pressure effects changes of field strength of the field element of the generator in correspondence with variations of tire pressure.

4. In an apparatus for indicating the air pressure of a vehicle wheel tire, a generator armature element and a generator field element supported in mutual inductive relation one upon a wheel and the other upon a non-rotating portion of the vehicle chassis, whereby upon rotation of the wheel current may be inductively generated in the armature element, an electric indicating instrument energized by the generated current, and movable means subjected to the air pressure and movable responsive to variations thereof to move one of the elements relative to the other to correspondingly vary the current generated.

5. In an apparatus for indicating the air pressure of a vehicle wheel tire, a generator armature element and a generator field element supported in mutual inductive relation one upon the wheel and the other upon a non-rotating portion of the vehicle chassis whereby upon rotation of the wheel current may be inductively generated in the armature element, an electric indicating instrument energized by the generated current, and movable means subjected to the air pressure and movable responsive to variations thereof to move the wheel supported element relative to the other element to correspondingly vary the current generated.

6. In an apparatus for indicating the air pressure of a vehicle wheel tire, a generator armature element and a generator field element supported in mutual inductive relation, one upon the wheel and the other upon a non-rotating portion of the chassis, whereby upon rotation of the wheel current may be inductively generated in the armature element, an electric indicating instrument energized by the generated current, and movable means subjected to the air pressure and movable responsive to variations thereof to effect a change of the mutual induction of the two elements to correspondingly vary the current generated.

7. In an apparatus for indicating the air pressure in a vehicle wheel tire, an armature winding supported on a relatively stationary portion of the vehicle chassis, a housing supported on the wheel and rotatable therewith and comprising an expansible and contractible chamber communicating with the air in the tire, a permanent field magnet associated with the housing and rotatable with the wheel periodically into and out of inductive relation to the winding, to generate current therein, the magnet being movable by expansion and contraction of the chamber to vary the inductive relation of the magnet and winding in correspondence with variations of air pressure to correspondingly vary the generated current, and a current responsive pressure indicating instrument actuated by the current.

8. In an apparatus for indicating the air pressure in a vehicle tire, a housing, a permanent magnet supported by the housing, an expansible and contractible chamber associated with the housing, and the magnet being movable by the chamber upon expansion and contraction thereof, a flexible connection between the chamber and the tire interior to subject the chamber interior to the air pressure of the tire, a support for the housing on the wheel constructed to permit adjustment of the housing relative to the support.

9. In an apparatus for indicating the air pressure of a vehicle wheel tire, a pair of windings supported on a relatively stationary portion of the vehicle chassis, an apparatus supported on the wheel and rotatable therewith and comprising an expansible and contractible chamber communicating with the air in the tire, a ferrous inductor element associated with the apparatus and rotatable with the wheel periodically into and out of inductive relation to the said windings, and movable by expansion and contraction of the chamber to vary the inductive relation of the element and the windings in correspondence with variations of air pressure, one of the windings being energized by a source of current on the vehicle and the other winding being connected to an indicating instrument.

10. In an apparatus for indicating the air pressure of a vehicle wheel tire, a generator armature element and a generator field element supported in mutual inductive relation one upon a wheel and the other upon a non-rotating portion of the vehicle chassis, whereby upon rotation of the wheel current may be inductively generated in the armature element, an electric indicating instrument energized by the generated current, and movable means subjected to the air pressure and movable responsive to variations thereof to move one of the elements relative to the other to correspondingly vary the current generated, and means causing the two elements to be also relatively moved commensurably with wheel rotational velocity by wheel-rotation effected centrifugal force to cause the generated current to be constant at all wheel rotational speeds for any given air pressure effected relative positions of the two generator elements.

11. In an apparatus for indicating the air pressure of a vehicle wheel tire, a generator armature element and a generator field element supported in mutual inductive relation one upon the wheel and the other upon a non-rotating portion of the vehicle chassis whereby upon rotation of the wheel current may be inductively generated in the armature element, an electric indicating instrument energized by the generated current, and movable means subjected to the air pressure and movable responsive to variations thereof to move the wheel supported element relative to the other element to correspondingly vary the current generated, and means causing said wheel-supported generator element to be also moved relative to the chassis-supported element commensurably with wheel rotational velocity by wheel rotation effected centrifugal force to cause the generated current to be constant at all wheel rotational speeds for any given air pressure effected relative positions of the two generator elements.

12. In an apparatus for indicating the air pressure of a vehicle wheel tire, a generator armature element and a generator field element supported in mutual inductive relation, one upon the wheel and the other upon a non-rotating portion of the chassis, whereby upon rotation of the wheel current may be inductively generated in the armature element, an electric indicating instrument energized by the generated current, movable means subjected to the air pressure and movable responsive to variations thereof to effect a change of the mutual induction of the two elements to correspondingly vary the current generated, and means for causing the mutual inductance of the two generator elements to change commensurably with rotational velocity of the wheel to cause the generated current to be constant at all wheel rotational speeds for any given pressure-effected mutual induction of the two generator elements.

13. In an apparatus for indicating the air pressure in a vehicle wheel tire, an armature winding supported on a relatively stationary portion of the vehicle chassis, a housing supported on the wheel and rotatable therewith and comprising an expansible and contractible chamber communicating with the air in the tire, a permanent field magnet associated with the housing and rotatable with the wheel periodically into and out of inductive relation to the winding, to generate current therein, the magnet being movable by expansion and contraction of the chamber to vary the inductive relation of the magnet and winding in correspondence with variations of air pressure to correspondingly vary the generated current, and a current responsive pressure indicating instrument actuated by the current, and the magnet being also movable under the action of wheel rotation-effected centrifugal force thereon and commensurable therewith to correspondingly vary the inductive relation of the magnet and winding to cause generated current to be substantially constant at all rotational speeds of the wheel for any air pressure effected inductive relation of the magnet and winding.

14. In an apparatus for indicating the air pressure of a vehicle wheel tire, an electro-responsive instrument for indicating tire pressure, an electric circuit for supplying electrical energy thereto, a relatively stationary means on the vehicle chassis and in the circuit, a device associated with the tire to rotate therewith comprising an element movable to different positions on the device and means for moving it responsive to changes of air pressure in the tire, the element being disposed relative to the tire so that rotation of the tire moves the element periodically into proximate spaced relation to the relatively stationary means and at different predetermined spaced distance therefrom corresponding to the different pressure responsive positions of the elements, the relatively stationary means being responsive to movement of the said element when in proximate spaced relation thereto to cause it to effect a change of energy to the instrument, and means for causing the movable element to move to different positions on the device responsive to variations of tire rotation-effected centrifugal force thereon, to cause the energy supplied to the instrument to be substantially constant at all rotational speeds for any pressure-responsive relative positions of the stationary means and movable element to cause the instrument to indicate a given air-pressure at all tire rotational speeds for any given tire pressure.

15. In combination with a vehicle comprising a chassis and a rotary supporting wheel having an inflatable tire thereon, an inflating stem for the tire having a main duct therethrough, means on the stem for effecting connection with a supply of air under pressure to inflate the tire, an expansible and contractible chamber in the stem communicating interiorly with the tire pressure, a magnet in the stem movable by expansion and contraction of the chamber to take up axial positions in the stem corresponding to variations of pressure in the tire, and a stationary electric generator armature on the chassis supported in approximate relation to the rotational path of the magnet in the stem to cause electric current to be generated in the armature upon rotation of the wheel of different values corresponding to different pressure-effected positions of the magnet in the stem relative to the generator armature.

16. In combination with a vehicle comprising a chassis and a rotary supporting wheel having an inflatable tire thereon, an inflating stem for the tire having a main duct therethrough, means on the stem for effecting connection with a supply of air under pressure to inflate the tire, an expansible and contractible chamber in the stem communicating interiorly with the tire pressure, a magnet in the stem movable by expansion and contraction of the chamber to take up axial positions in the stem corresponding to variations of pressure in the tire, and a stationary electric generator armature on the chassis supported in approximate relation to the rotational path of the magnet in the stem to cause electric current to be generated in the armature upon rotation of the wheel of different values corresponding to different pressure-effected positions of the magnet in the stem relative to the generator armature, and the magnet also being movable in the stem under the action of wheel rotation-effected centrifugal force, a spring in the stem opposing said centrifugal force-effected movement to cause the magnet to take up different positions in the stem relative to the generator armature corresponding to different wheel velocities to cause the generated current to be substantially constant at all wheel velocities or any pressure-effected position of the magnet in the stem, and an electric instrument on the chassis energized by the generated current and indicating current values.

17. In an apparatus for indicating the air pressure of a vehicle wheel tire, a pair of windings supported on a relatively stationary portion of the vehicle chassis, an apparatus supported on the wheel and rotatable therewith and comprising an expansible and contractible chamber communicating with the air in the tire, a ferrous inductor element associated with the apparatus and rotatable with the wheel periodically into and out of inductive relation to the said windings, and movable by expansion and contraction of the chamber to vary the inductive relation of the element and the windings in correspondence with variations of air pressure, one of the windings being energized by a source of current on the vehicle and the other winding being connected to an indicating instrument, and the inductor element being also movable under the action of wheel rotation effected force thereon and commensurably therewith to correspondingly vary the inductive relation of the element and the windings to cause current to be generated in the instrument connected winding commensurable with pressure-effected variations of the inductive relation of the said element and the windings, and to cause the generated current to be substantially constant at all wheel velocities for any said pressure-effected inductive relation.

18. In an apparatus for indicating the air pressure in a vehicle tire, a housing, a permanent magnet constituting an electric generator field element supported by the housing, an expansible and contractible chamber associated with the housing, and the magnet being movable by the chamber upon expansion and contraction thereof, a conduit communication between the chamber interior and the tire interior to subject the chamber to the air pressure of the tire, a support for the housing on the wheel and an electric current generator armature element supported on a stationary part of the vehicle, the support being constructed to permit adjustment of the housing relative to the support to adjust the relative position of the field and armature elements.

19. In an apparatus for indicating the air pressure in a vehicle wheel tire, a housing adapted to be supported on the wheel and rotatable therewith, a permanent magnet supported by the housing, an expansible and contractible chamber associated with the housing, and the magnet being movable by the chamber upon expansion and contraction thereof, conduit means for effecting communication between the chamber interior and the tire interior to subject the chamber to the air pressure of the tire to correspondingly move the magnet commensurably with changes of air pressure in the tire, and the magnet being movable also under the action of tire rotation effected centrifugal force to take up positions in the housing commensurable with tire rotational velocity and a spring yieldably opposing centrifugal force effected movement of the magnet.

20. The combination with a vehicle wheel tire having an inflating stem and a check valve in the stem, of a housing, a permanent magnet supported by the housing, an expansible and contractible chamber associated with the housing, the magnet being movable by the chamber upon expansion and contraction thereof, a conduit communication between the chamber interior and the tire inflating stem interior inwardly of the stem valve to subject the chamber to the air pressure of the tire, a support for the housing on the wheel, and the magnet being also movable under the action of tire rotation effected centrifugal force to take up positions corresponding to tire rotational velocity, and a spring yieldingly opposing centrifugal force effected movement of the magnet.

21. In an apparatus for indicating the air pressure in a vehicle tire, a housing, a ferrous inductor element supported by the housing, means for moving the inductor element to cause it to take up different positions responsive to changes of vehicle tire pressure, a support for the housing on the wheel, an electric generator armature element on the vehicle and means for relatively adjusting the proximity of the armature element and the rotational path of the inductor element.

22. In an apparatus for indicating the air pressure in a vehicle tire, a housing, a permanent magnet supported by the housing, means for moving the magnet to cause it to take up different positions responsive to changes of vehicle tire pressure, a support for the housing on the wheel, an electric generator armature element on the vehicle and means for relatively adjusting the proximity of the armature element and the rotational path of the magnet.

DALE S. COLE.